J. G. GIBSON & J. M. CHAMBERLIN.
ADVERTISING LAY-OUT SHEET.
APPLICATION FILED OCT. 30, 1915.

1,185,995. Patented June 6, 1916.

J. G. GIBSON & J. M. CHAMBERLIN.
ADVERTISING LAY-OUT SHEET.
APPLICATION FILED OCT. 30, 1915.
1,185,995.
Patented June 6, 1916.
2 SHEETS—SHEET 2.
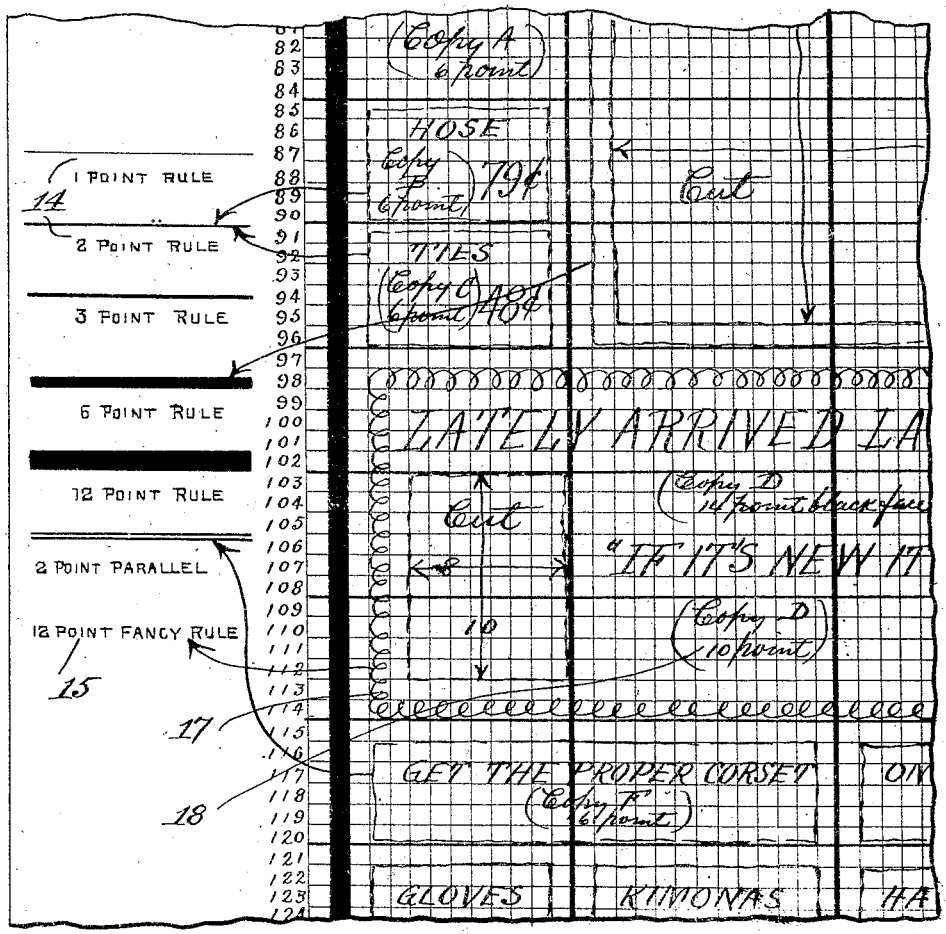
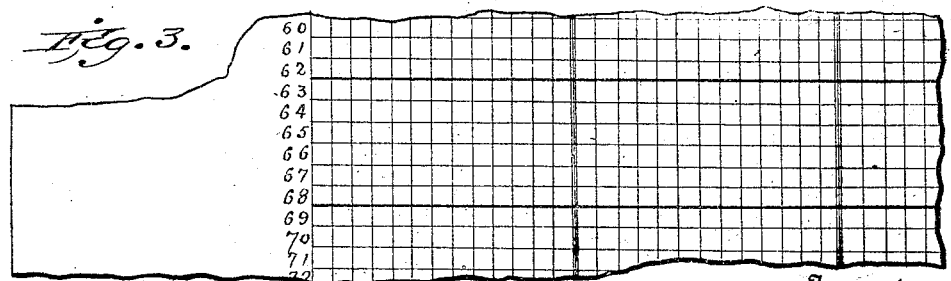
Inventors
John G. Gibson and
Jennie M. Chamberlin
By Edwin L. Jewell their Attorney

UNITED STATES PATENT OFFICE.

JOHN G. GIBSON AND JENNIE M. CHAMBERLIN, OF WILKES-BARRE, PENNSYLVANIA.

ADVERTISING-LAY-OUT SHEET.

1,185,995.   Specification of Letters Patent.   Patented June 6, 1916.

Application filed October 30, 1915. Serial No. 58,937.

*To all whom it may concern:*

Be it known that we, JOHN G. GIBSON and JENNIE M. CHAMBERLIN, citizens of the United States, residing at Wilkes-Barre, in the county of Luzerne and State of Pennsylvania, have invented certain new and useful Improvements in Advertisement-Lay-Out Sheets, of which the following is a specification.

This invention relates to improvements in advertisement lay-out sheets which are especially adapted for use by advertising managers of business firms in plotting their advertising matter for the newspapers, and has for its particular object to provide a sheet which is so ruled that the copy written therein will designate the size of type to be used in printing the sheet.

A further object is to also designate the number of type ems between the column lines, so that the matter can be readily measured.

A still further object is to provide certain designating characters on the margin of the sheet to which reference can be had to describe certain particular sizes of type and rules.

These and other objects are attained by the means illustrated in the accompanying drawings, in which:—

Figure 1 is a view illustrating one of our improved sheets on a miniature scale having the central portions broken away to show the four corners of the sheet. Fig. 2 is a fragmentary view of a portion of the sheet, showing the same full sized and illustrating the manner of using the sheet in preparing copy, and Fig. 3 is a like view to Fig. 2, showing a modified form of column lines.

The sheet is ruled vertically and horizontally to provide a plurality of small squares, which extend from side to side, and top to bottom, forming an area equal to the full size of the printed matter contained on a newspaper page. In other words, the lines 4 and 5 designate the limit of the vertical edges of the printed matter contained on a newspaper page, and the lines 6 and 7 designate the limit of the top and bottom lines of matter printed on a newspaper page. Preferably this sheet is ruled with vertical lines 8, which designate the column lines of a newspaper, and it will be understood that as many columns can be designated as desired to facilitate its use to the different size newspapers, which contain six, seven, eight or more columns. The sheet is also provided with horizontal lines 9, which separate the sheet into inches, and it will be understood that any number of inches can be used according to the size of the newspaper to which the copy is to be furnished; in the present instance, the number of inches designated is twenty-three, said horizontal lines being numbered consecutively from top to bottom, as indicated at 10 in Fig. 1.

The particular object of this invention is to divide the sheet into spaces which designate type points, which are used in measuring the height of the type, and in the present instance, we have shown the sheet ruled in pica size, which is a 12-point type, six of which will measure an inch in height. Therefore, in one inch there will be represented seventy-two type points. Our reason for using this particular size is that the pica size is the usual standard measurement for measuring type matter.

In the preferred form shown in the drawings, the column width is indicated as thirteen pica ems, and at the top of the sheet as indicated at 11, are indicating characters running from one to thirteen, which indicate the number of pica ems to each column. Along the front edge of the sheet are a plurality of indicating characters 12, which indicate the number of picas from the top to the bottom of the sheet, the same being numbered consecutively from 1 to 138.

The sheet is preferably cut much larger than the ruled portion, so as to provide margins around said ruled portion, and preferably a portion of these margins have printed thereon certain indicating characters 13, for illustrating certain sizes of type and other indicating characters 14, which illustrate the size of certain rules. It will be understood that we do not wish to limit ourselves to the particular face characters of type presented, as any style of type can be used, and it will further be understood that we may use simply certain description, as indicated at 15 without using representation of a particular kind of type or rule.

Across the head of the sheet may be printed the single line 16 upon which the name of the advertiser can be written or printed.

The rules of the sheet illustrated in Fig. 1 are approximately one-half the size of the pica type; in other words, it is a reduced view of about one-half size.

As above stated, we do not wish to limit ourselves to the size of form shown in the drawings, as the form can be divided into five, six, seven or eight columns, and each column can be divided into inch spaces from twenty inches or more, and the small squares can be made to indicate any size type from 4½-point to 12-point, or larger if desired, and the column widths can be made to accommodate any number of ems desired. In practical use, these forms are printed as indicated in the drawings, and the lines, excepting the column lines, are usually ruled very light and pale, so that the advertising manager who wishes to plot out a certain advertising sheet can write over these light lines with black or red ink, or any other color, preferably red, so that they will stand out in contrast to the light ruled lines. The column lines are usually indicated heavy, as also the inch lines, and as shown in Fig. 3 of the drawings, the column lines instead of being a heavy black line can be indicated by three fine lines, the center line of which would indicate the true width of the columns, and the lines on each side of each center line would indicate the limit of the printed matter.

An advertising manager having one of these sheets before him can plot out the whole sheet or any portion of it, and arrange the copy to be used for the next day's advertising, and in Fig. 2 we have illustrated the manner in which he would designate the different positions of the copy.

In Fig. 2 at 17 is designated a series of curves joined together forming a portion of a rectangle, the same being drawn between the two ruled lines and extending from said curved lines to certain descriptive matter on the margin of the sheet is a lead line, which would indicate to the compositor setting up the advertising matter that these curved lines are to be represented in the printed matter by a 12-point fancy rule. Within the same curved lines is roughly indicated the words "Lately arrived." The letters of these words, it will be observed, extend the height of two pica spaces, thus the printer will know that this type is of 24-point size. In other words, the size of the type to be used in the advertisement is designated in the copy by the number of spaces covered by the letters of the copy. Where smaller type than the 12-point size is used, the advertising manager's copy is inscribed, as at 18, such as copy A, B, C, etc., 10-points, so that the printer will know that other copy separate from the form will be furnished and the same is to be set in 10-point size. In this manner an advertising manager can plot out his advertisements, cover a whole sheet of a newspaper or any portion thereof, and at the same time, he will designate to the printer exactly the size type to be used and the exact location in which it is to be placed in the printed form.

Having thus described our invention, what we claim as new and desire to secure by Letters Patent, is:—

1. An advertising lay-out sheet provided with column divisions to simulate the form of a newspaper page and having spaces indicated thereon corresponding in height to the type-point measure of a particular size of type, said spaces being arranged contiguous to each other to permit the inscribing of letters across one or more spaces to define the height of letters greater than the height of one space and to correspond to the size and arrangement of the type and type-matter composed from said sheet.

2. An advertisement lay-out sheet provided with column divisions to simulate the form of a newspaper page and having spaces indicated thereon corresponding in height to the type-point and em measure of a particular size of type, said spaces being arranged contiguous to each other to permit the inscribing of letters across one or more spaces to define the height of letters greater in height than one space and the length of the inscribed lines and to correspond to the size and arrangement of the type and type-matter composed from said sheet.

3. An advertisement lay-out sheet provided with column divisions to simulate the form of a newspaper page and having spaces indicated thereon corresponding in height to the type point and em-measure of a particular size of type, said spaces being arranged contiguous to each other to permit the inscribing of letters across one or more spaces to define the height of letters greater than the height of one space and the length of the inscribed lines and to correspond to the size and arrangement of the type and type-matter composed from said sheet, said column divisions being displayed prominently relative to the outline of the spaces to clearly define the columns.

4. An advertisement lay-out sheet provided with column divisions to simulate the form of a newspaper page and having spaces indicated thereon corresponding in height to the type-point and em measure of a particular size of type, said spaces being arranged contiguous to each other to permit the inscribing of letters across one or more spaces to define the height of letters greater than the height of one space and the length of the inscribed lines and to correspond to the size and arrangement of the type and type-matter composed from said sheet, said column divisions being displayed prominently relatively to the outline of the spaces to clearly define the columns, and certain of the horizontal outlines of the spaces being also displayed prominently to divide the spaced area into one inch spaces.

5. An advertisement lay-out sheet provided with column divisions to simulate the form of a newspaper page and having spaces indicated thereon corresponding in height to the type-point and em measure of a particular size of type, said spaces being arranged contiguous to each other to permit the inscribing of letters across one or more spaces to define the height of letters greater in height than one space and the length of the inscribed lines and to correspond to the size and arrangement of the type and type-matter composed from said sheet, said column divisions and certain horizontal outlines of the spaces being displayed prominently to clearly define the columns and divide the spaced area into one inch spaces respectively.

6. An advertisement lay-out sheet provided with column divisions to simulate the form of a newspaper page and having spaces indicated thereon corresponding in height to the type-point measure and em measure of a particular size of type, said spaces being arranged contiguous to each other to permit the inscribing of letters across one or more spaces to define the height of letters greater in height than the height of one space and the length of the inscribed lines and to correspond to the size and arrangement of the type and type-matter composed from said sheet, and means at the margin of the spaced area for indicating the number of spaces extending horizontally and vertically of the sheet.

7. An advertisement lay-out sheet provided with column divisions to simulate the form of a newspaper page and having spaces indicated thereon corresponding in height to the type-point measure and em measure of a particular size of type, said spaces being arranged contiguous to each other to permit the inscribing of letters across one or more spaces to define the height of letters greater in height than the height of one space and the length of the inscribed lines and to correspond to the size and arrangement of the type and type-matter composed from said sheet, and means at the margin of the spaced area for indicating the number of spaces extending horizontally and vertically of the sheet, and other means on the margin to which lines can be drawn to indicate the particular type and rules desired for certain spaces.

In testimony whereof we affix our signatures.

JOHN G. GIBSON.
JENNIE M. CHAMBERLIN.